Dec. 8, 1936.  R. S. KINKEAD  2,063,168
MOWER
Filed Aug. 14, 1935  3 Sheets-Sheet 1
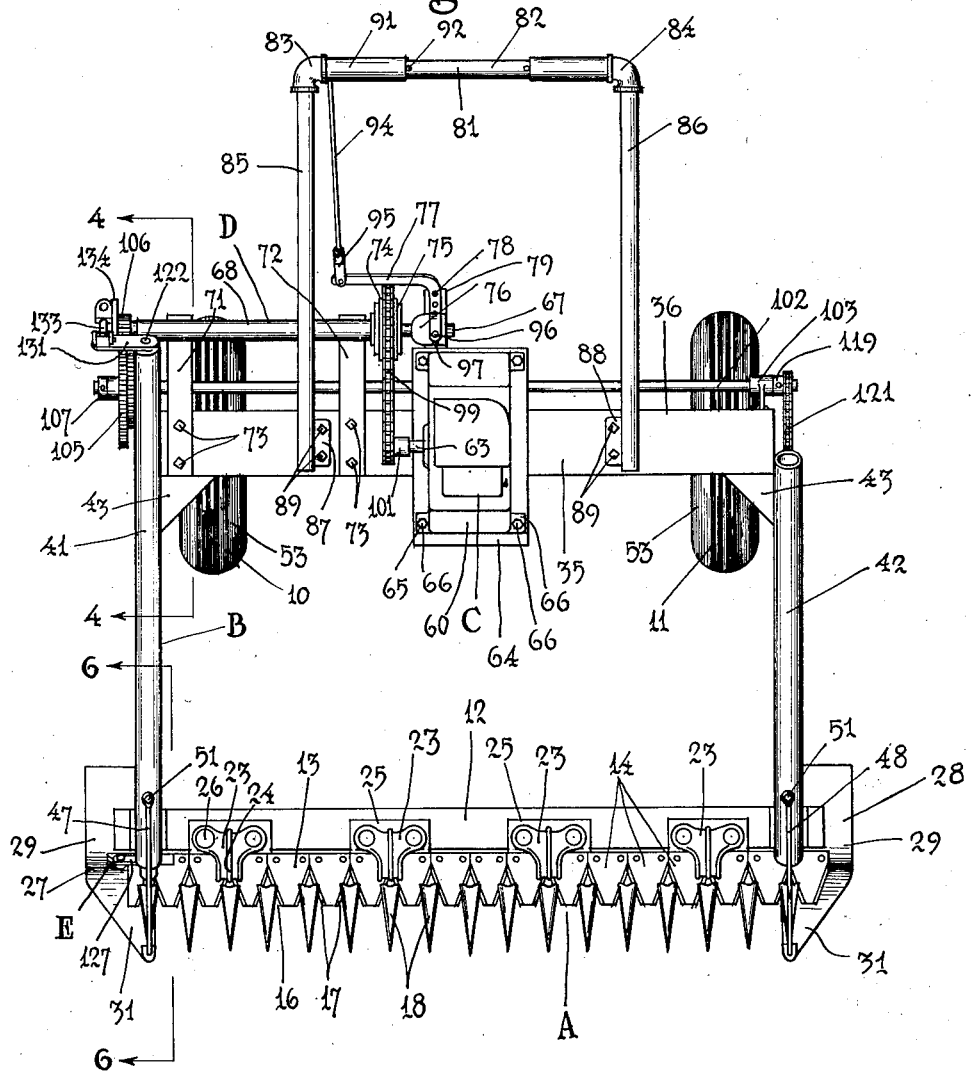
Inventor
Robert S. Kinkead
By Caswell & Lagaard
Attorneys Dec. 8, 1936.                R. S. KINKEAD                2,063,168
                                MOWER
                        Filed Aug. 14, 1935           3 Sheets-Sheet 2
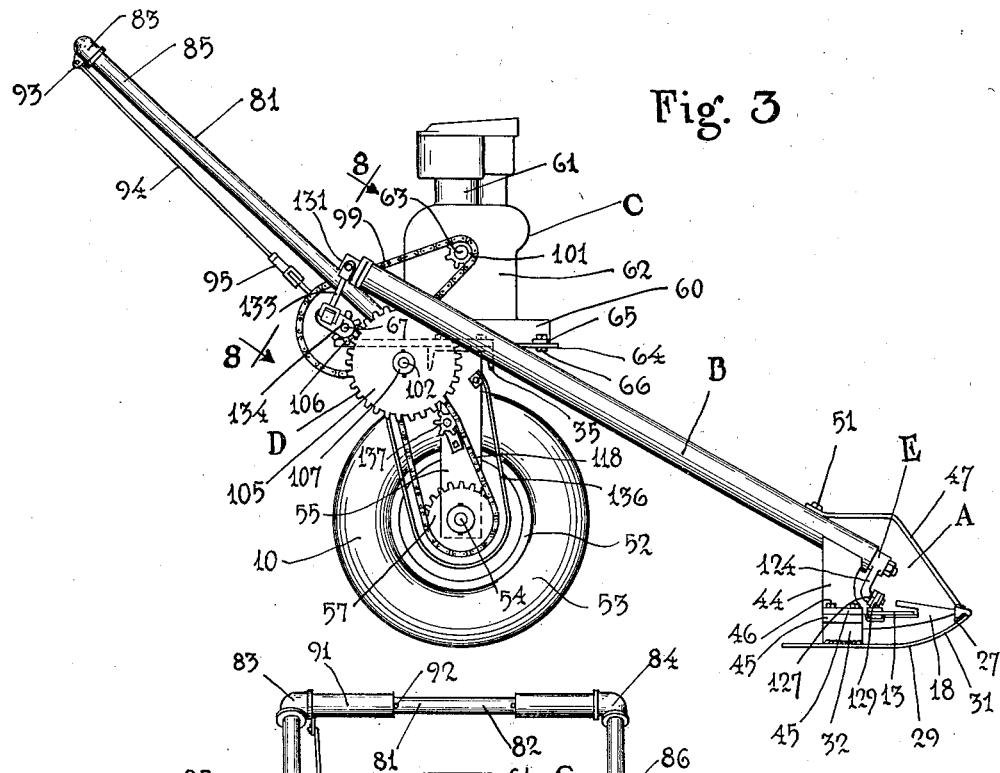
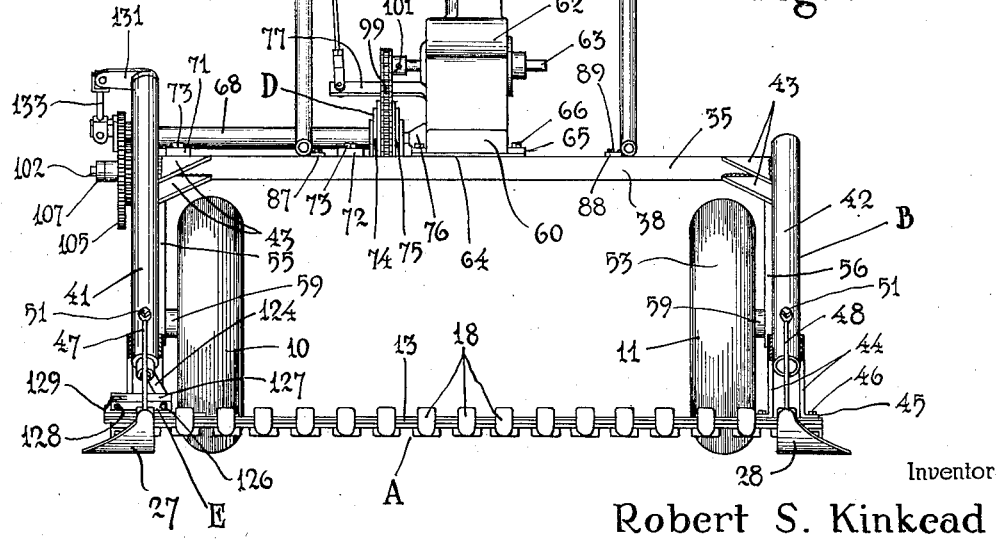
Inventor
Robert S. Kinkead
By Caswell & Lagaard
Attorneys

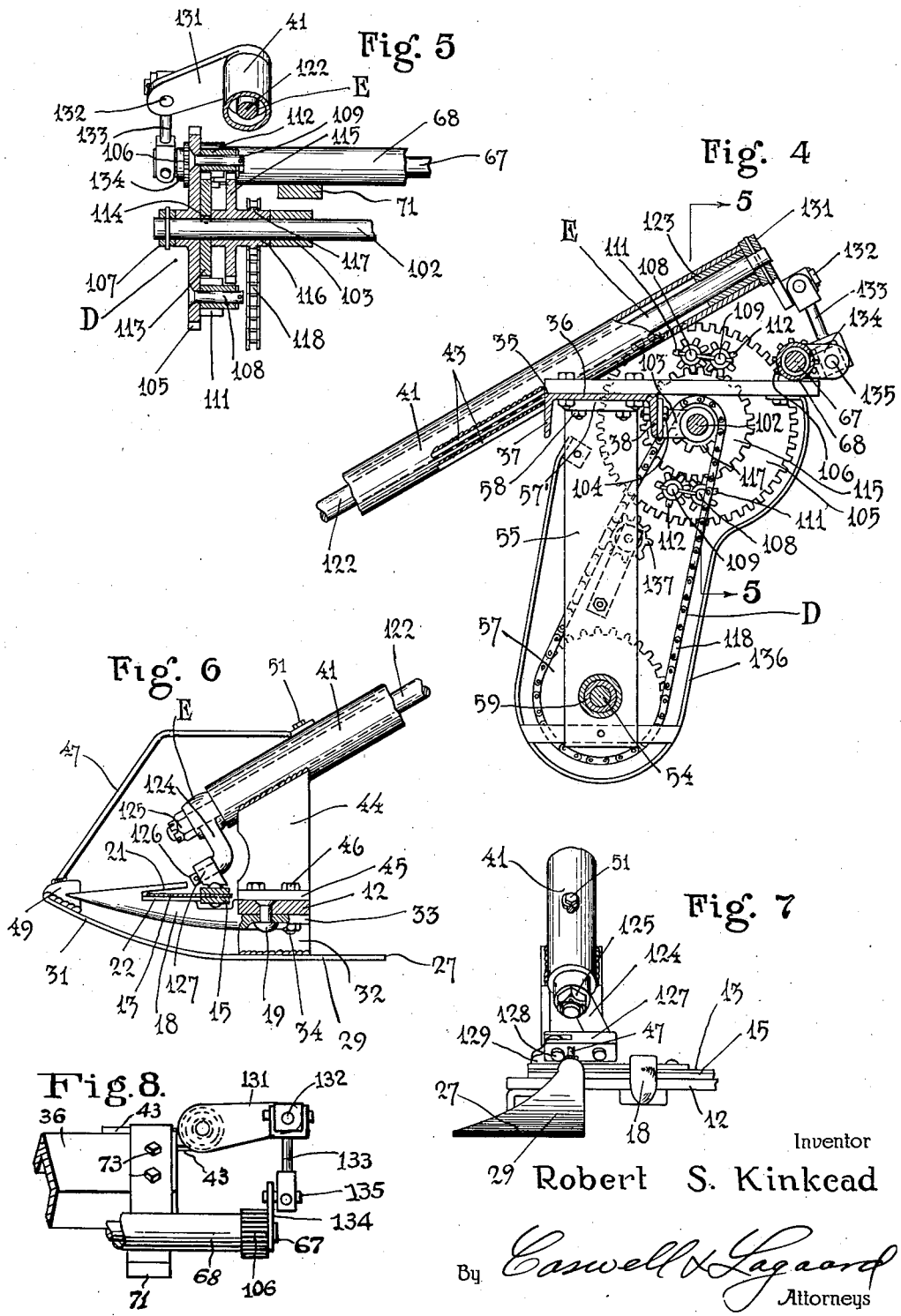

Patented Dec. 8, 1936

2,063,168

UNITED STATES PATENT OFFICE 2,063,168

MOWER

Robert S. Kinkead, St. Paul, Minn.

Application August 14, 1935, Serial No. 36,116

8 Claims. (Cl. 56—25)

My invention relates to power propelled and operated mowers and particularly to the type of mower steered by a person walking behind the mower.

An object of the invention resides in providing a mower of the type described, particularly adapted to perform its functions without injuring the ground over which it travels.

Another object of the invention resides in providing a mower which will effectively cut tall grass and weeds and which is constructed in a manner to cut and lay the grass down without interference with the proper operation of the mower.

A still further object of the invention resides in providing a mower which will have a high clearance, whereby the mower may be used in tall grass and which at the same time may utilize relatively small wheels making it practical to employ rubber tires on the wheels.

A feature of the invention lies in having the driving wheels run on short separate axles and driven from a countershaft placed above them, thereby permitting high clearance for cutting with comparatively small wheels.

Another object of the invention resides in constructing the mower with a cutting mechanism having a cutter bar and a sickle movable along the same and in providing a frame for the cutting mechanism including a transverse frame member disposed rearwardly of the cutter bar at an elevation above the same and connected to the cutter bar by means of two longitudinal frame members disposed substantially in spaced parallel vertical planes.

A feature of the invention resides in constructing the mower so that the swath thereof will be substantially equal to the distance between the planes of said longitudinal frame members.

Another object of the invention resides in constructing the mower so that all of the mechanism for operating the sickle and propelling the mower lie outwardly of or in the planes of the spaced longitudinal frame members and above the transverse frame member so that full clearance is provided within such space, permitting of the operation of the mower in extremely tall grass.

A still further object of the invention resides in arranging one of said longitudinal frame members in an inclined manner and in providing an elongated member following along said inclined frame member for operating the sickle.

An object of the invention resides in constructing said inclined frame member from a tube and in providing a shaft within the tube journaled therein for operating said sickle.

A feature of the invention resides in providing a counter-shaft disposed substantially at the elevation of the transverse frame member or above the same, said counter-shaft carrying sprockets at the ends thereof and in providing chains driven from said sprockets for operating said wheels.

Another object of the invention resides in mounting a motor on said transverse frame member and in providing a transmission for driving said sprockets, said transmission including as an element said counter-shaft.

A still further object of the invention resides in arranging the wheels inwardly of the planes of the longitudinally extending frame member.

Other objects of the invention reside in the novel combination and arrangement of parts and in the details of construction hereinafter illustrated and/or described.

In the drawings:

Fig. 1 is a plan view of a mower illustrating an embodiment of my invention.

Fig. 2 is a front elevational view of the structure shown in Fig. 1.

Fig. 3 is a side elevational view of the structure shown in Figs. 1 and 2.

Fig. 4 is an elevational sectional view taken on line 4—4 of Fig. 1 and drawn to a larger scale.

Fig. 5 is an elevational sectional view taken on line 5—5 of Fig. 4.

Fig. 6 is a fragmentary elevational sectional view taken on line 6—6 of Fig. 1.

Fig. 7 is a front elevational view of the structure shown in Fig. 6.

Fig. 8 is a fragmentary elevational detail view taken on line 8—8 of Fig. 3.

My invention includes a cutting mechanism indicated in its entirety by the reference character A which is supported upon a frame B. Frame B is carried by two supporting wheels 10 and 11 which in conjunction with the cutting mechanism A support the mower in proper elevation with respect to the ground over which the mower travels. Frame B has mounted on it a motor C which is adapted to drive through a suitable power transmission D, the wheels 10 and 11. Motor C also operates the cutting mechanism A through a suitable power transmission indicated in its entirety by the reference letter E. These various parts will now be described in detail.

The cutting mechanism A includes a cutter bar 12 as best shown in Figs. 1 and 6 which extends transversely of the mower. This cutter bar supports the various parts of the cutting mechanism and is attached to the frame B. The cutting mechanism further includes a sickle 13 which comprises a number of sickle sections or cutters 14 which are arranged adjacent one another and riveted or secured to a sickle bar designated by the reference numeral 15. The sickle sections 14 are constructed V-shaped in formation to leave V-shaped notches 16 therebetween into which the grass may enter. The edges 17 of the sickle section 14 are sharpened so that the said edges serve to cut the grass when the sickle is reciprocated.

Attached to the underside of the cutter bar 12 are a number of pointed guards 18 which are secured to said cutter bar by means of rivets 19. These guards are provided with slots 21 through which the blades or sickle sections 14 may pass. The said guards have attached to them cutter plates 22 on which the sickle sections rest and which cooperate with the sickle sections 14 to cut the grass entering the notches 16. The sickle 13 is held in proper contact with the cutter plates 22 by means of a number of clips 23 which are riveted to the cutter bar 12 by means of rivets 26. These clips have fingers 24 which overlie the sickle sections 14 and hold the same in contact with the cutter plates 22. The sickle bar is further guided by means of plates 25 which engage said sickle bar at the rearward edge thereof. Plates 25 are held attached to the cutter bar 12 by means of rivets 26 which hold the clips 23 attached to the said cutter bar.

The cutting mechanism further comprises two shoes 27 and 28 which are best shown in Figs. 1 and 6. These shoes are formed with runners 29 which rest upon the surface over which the mower travels, said runners having upturned portions 31 at their forward ends. The shoes 27 and 28 have attached to them uprights 32 which are constructed with flanges 32 issuing outwardly therefrom. Flanges 33 are secured to the cutter bar 12 by means of bolts 34. The shoes 27 and 28 are so designed that the sickle 13 is at the proper elevation above the ground to cut off the grass at the proper height. If desired the height of the sickle 13 may be raised by inserting shims between the flange 33 and the cutter bar 12.

The frame B comprises a transverse frame member 35 which is disposed rearwardly of the cutter bar 12 and at an elevation considerably above the same. This transverse frame member may be constructed from a length of channel iron which is provided with a web 36 and two flanges 37 and 38 issuing outwardly from said web. Frame member 35 is arranged in inverted position with the flanges 37 and 38 projecting downwardly. The transverse frame member 35 has welded to the ends thereof two longitudinally extending frame members 41 and 42 best shown in Fig. 4. These frame members are preferably tubular, being constructed of iron pipe and are open at their ends. For bracing the said frame, gusset plates 43 are employed which are welded to the longitudinal frame members 41 and 42 and to the transverse frame member 35. These gusset plates are best shown in Figs. 1 and 4. The forward ends of the longitudinal frame members 41 and 42 have legs 44 secured thereto which are welded to said frame members and extend downwardly therefrom. These legs are provided with outwardly turned flanges 45 which serve as feet for attaching the framework to the cutting mechanism. The flanges 45 are adapted to rest upon the ends of the cutter bar 12 and are bolted thereto by means of cap screws 46.

At the ends of the cutting mechanism A are provided two dividers 47 and 48 best shown in Figs. 1 and 3. These dividers consist of rods which are bent in the form shown in Fig. 3 and which are welded to the forward ends 49 of the shoes 27 and 28. These dividers extend upwardly and rearwardly and are secured to the longitudinal frame members 41 and 42 by means of bolts 51. The dividers 47 and 48 lie in the planes of the frame members 41 and 42 and in conjunction therewith serve to divide the uncut portion of the grass from that being cut.

The wheels 10 and 11, as best shown in Figs. 1 and 4, may be of any desired construction. In the drawings, rubber tired wheels have been shown which have rims 52 supporting rubber tires 53. The wheels further include stub axles 54 attached thereto by means of which the wheels are journaled. The wheels 10 and 11 are supported through two depending frame members 55 and 56 which extend downwardly from the transverse frame member 35. These frame members are formed with flanges 57' which are bent outwardly therefrom and which underlie the web 36 of said transverse frame member. The depending frame members 55 and 56 are bolted to the frame member 35 through bolts 58 which pass through the flanges 47 and the web 36 of said transverse frame member. The depending frame members 55 and 56 are provided at their lower ends with bearings 59 which are secured thereto and in which the stub axles 54 are journaled. These stub axles extend completely through the said bearings and are exposed on the outer surfaces thereof where the said stub axles have attached to them sprockets 57 by means of which the wheels may be rotated.

For guiding the mower for travel over the ground a handle 81 is employed. This handle consists of a transverse handle bar 82 preferably constructed of pipe which is connected by means of two elbows 83 and 84 to two longitudinally extending pipes 85 and 86. These latter pipes have flanges 87 and 88 welded to the same which are disposed at angle with respect to the pipes 85 and 86. Bolts 89 pass through said flanges and the web 36 of the transverse frame member 35 and serve to hold the handle 81 attached to the frame B of the invention.

For the purpose of propelling the mower and for operating the cutting mechanism thereof, the motor C is used. Inasmuch as any suitable source of power may be employed, the motor C has not been illustrated in detail. In the drawings, I have shown an engine constructed with a cylinder 61, a crank case 62 and a crank shaft 63 journaled in the crank case and operated by the piston traveling in cylinder 61. The crank case 62 is provided with a base 60 which is formed with outwardly extending ears 65. This base rests upon a plate 64 welded to the web 36 of channel 35. Bolts 66 pass through the said ears and plate and hold the engine attached to the transverse frame member 35.

The transmission D includes a counter-shaft 67. This counter-shaft is journaled in a single tubular bearing 68 which is constructed of a length of pipe and is welded to two brackets 71 and 72. Brackets 71 and 72 overlie the web 36 of transverse frame member 35 and are secured thereto by means of bolts 73. Shaft 67 has rotatably mounted on it a sprocket 74 which is constructed with a clutch 75 including an operating cone 76 by means of which the clutch may be operated to cause the sprocket 74 to travel with shaft 67 or to travel freely with respect thereto. The operating cone 76 for the clutch 75 is shifted on shaft 67 by means of a lever 77 which is pivoted at 78 to a support 79 attached to the plate 64. Upon the handle bar 82 is rotatably mounted a sleeve 91 which is held from longitudinal movement by means of a pin 92 extending through the handle bar 82. This sleeve has attached to it a lever 93 which projects downwardly therefrom. Lever 93 has pivotally connected to it a link 94 which in turn is adjustably connected by means of a clevice 95 with the lever 77. Lever 77 in turn is provided with pins 96 which engage within a groove 97 in the cone 76 and cause movement of said cone along said shaft as the sleeve 91 is rotated. By means of this construction the clutch 75 may be operated by the operator while the mower is being steered and without interfering with the proper guidance of the mower. Sprocket 74 is driven from the crank shaft 63 of the engine or motor C by means of a chain 99. This chain passes over a sprocket 101 mounted on the said crank shaft and over the sprocket 74 carried by the counter-shaft 67.

The transmission D further includes another counter-shaft 102 which is journaled in bearings 103 secured to the transverse frame member 35 by means of bolts 104. This counter-shaft has rotatably mounted on it at one end a spur gear 105. A spur pinion 106 attached to the counter-shaft 67 meshes with the spur gear 105 and drives the same. Gear 105 is held from longitudinal movement in one direction by means of a collar 107 which is attached to the end of shaft 102. Gear 104 has secured to it two pairs of stub shafts 108 and 109, the shafts 108 and 109 being positioned in close proximity to one another and the two pairs being disposed diametrally opposite one another. On these shafts are mounted spur pinions 111 and 112. Secured to the shaft 102 is a spur gear 113 which meshes with the pinions 111. Spur gear 113 is keyed to the shaft 102 by means of a key 114. Adjacent the spur gear 113 is another spur gear 115 having the same diameter and the same number of teeth as the gear 113. This spur gear meshes with the pinions 112. It will be noted that the pinions 111 and 112 also mesh with one another. The spur gear 115 is provided with a hub 116 which is constructed with a sprocket 117. A chain 118 passes over this sprocket and the sprocket 57 fast on wheel 10 mounted on stub axle 54. Another sprocket 119 similar to sprocket 117 is secured to the other end of the shaft 102. A chain 121 passes over this sprocket and the sprocket 57 of wheel 11. These chains and sprockets serve to drive the respective wheels. The gearing 113, 115, 111 and 112 form a spur gear differential by means of which the two wheels of the mower may be driven from the gear 105 and by means of which the mower may be readily steered and easily manipulated.

For the purpose of operating the sickle 13 a shaft 122 is employed which extends through the tubular frame member 41 of frame B. This shaft is journaled in bearing 123 set into the ends of said frame member. The lower end of shaft 122 has secured to it a crank 124 which is held in place thereon by means of a nut 125 screwed on the end of the shaft. This crank is formed with a crank pin 126 which passes through a pitman 127. Pitman 127 as best shown in Fig. 2 is connected by means of a bolt 128 to a lug 129 attached to the end of the sickle bar 15. As the shaft 122 is oscillated back and forth the sickle 13 is given a reciprocating movement, causing the same to cut the grass as the mower passes over the ground.

The upper end of the shaft 122 has attached to it a crank 131. This crank is provided with a crank pin 132 which projects outwardly therefrom. A pitman 133 is pivoted to the crank 131 on the crank pin 132 and is operated by means of another crank 134 secured to the end of the counter shaft 67. Crank 134 is constructed with a crank pin 135 on which the other end of the pitman 133 is journaled. The throw of the crank 134 is considerably less than that of the crank 131 so that the shaft 67 may make a complete revolution and while so revolving only rocks the shaft 122 a sufficient amount to procure operation of the sickle 13.

For the purpose of guarding the chains and the various gearing of the invention, guards 136 may be employed which are attached to the depending frame members 55 and 56 and to such other portions of the frame as lie in proximity thereto. Tighteners 137 may also be employed for maintaining proper tension in the driving chains 118 and 121.

In the use of the invention, the clutch 75 is thrown out and the engine started. The mower is sufficiently light and due to the use of rubber tired wheels may be easily moved about manually without difficulty. When the mower is at the proper positon the clutch is turned on by means of the sleeve 81 and both the propelling mechanism and mower operating mechanism are started. The operator then merely steers the mower in the customary manner. Due to the fact that the swath of the sickle is coextensive with the dividers 47 and 48, a clean division is procured between the cut and the uncut grass or weeds. Due to the fact that the frame members 41 and 42 are substantially in the plane of the dividers 47 and 48 the cut grass is laid down between the said frame members and no entanglement of the grass with the mechanism of the invention occurs. It will also be noted that the driving mechanism for the wheels is in the plane of the frame members 141 and 142 and that the transmission and other operating parts of the invention with exception of the wheels, lie without the space between the frame members 41 and 42 and above the frame member 35. It will hence become obvious that grass may be cut of a height equal to the clearance afforded by the frame member 35 and even higher without difficulty and that a clear passageway is provided in the framework through which the cut grass passes.

My invention is highly advantageous in that a device is procured to cut grass of considerable height. The grass is laid down between the frame members and will not become entangled with the operating parts of the mower. The mower steers and handles easily. By the use of tubular longitudinal frame members the operating mechanism for the sickle can be mostly enclosed so that entanglement of the grass with the mechanism is entirely prevented. By means of said construction the grass is accurately divided and very little of the standing grass is trodden down so that the swath is clean and accurate. This permits of cutting the second swath without difficulty. By arranging the supports for the wheels in the manner illustrated, the wheels roll over the cut grass without danger of causing the grass to wind upon the axles thereof or to become entwined with the driving mechanism for the wheels. At the same time the uncut grass is not trampled down. My invention is extremely simple and practical in construction and can be built at an economical cost.

Changes in the specific form of my invention, as herein disclosed, may be made within the scope of what is claimed without departing from the spirit of my invention.

Having described my invention, what I claim as new and desire to protect by Letters Patent is:

1. In a mower, a cutting mechanism including a cutter bar, a sickle movable along said cutter bar, a frame for supporting said cutter bar, said frame including a transverse frame member disposed rearwardly of the cutter bar and at an elevation above the same, frame members extending from said transverse frame member to said cutter bar, and disposed substantially in two spaced parallel vertical planes, said frames also including depending frame members disposed substantially in said planes, wheels carried by said depending frame members and disposed inwardly thereof and entirely below said transverse frame member, said cutting mechanism having a swath substantially equal to the distance between said planes, a motor carried by said transverse frame member, a countershaft extending transversely of the frame and disposed to have a clearance not less than that of said transverse frame member, sprockets at the ends of said shaft, sprockets concentric with said wheels and driving the same, said sprockets being disposed outwardly of said wheels, chains for driving said second named sprockets from said first named sprockets, and means including said shaft and sprockets for driving said wheels from said motor.

2. In a mower, a cutting mechanism including a cutter bar, a sickle movable along said cutter bar, a frame for supporting said cutter bar, said frame including a transverse frame member disposed rearwardly of the cutter bar and at an elevation above the same, frame members connected to said transverse frame member and said cutter bar, one of said members being tubular, wheels carried by said frame, an elongated member extending through said tubular frame member, a motor carried by said transverse frame member, a crank arm connected with the upper end of said elongated member, drive means between said motor and crank arm, a crank arm connected to the lower end of said elongated member and linkage between said second named crank arm and said sickle.

3. In a mower, a cutting mechanism including a cutter bar, a sickle movable along said cutter bar, a frame for supporting said cutter bar, said frame including a transverse frame member disposed rearwardly of the cutter bar and at an elevation above the same, frame members connected to said transverse frame member and said cutter bar, one of said members being tubular, wheels carried by said frame, a shaft extending through said tubular frame, and journaled therein, a motor carried by said transverse frame member, a crank on the lower end of said shaft, means for connecting said crank to said sickle, and means at the upper end of said shaft for operating the shaft from said motor.

4. In a mower, a cutting mechanism including a cutter bar and a sickle movable along said cutter bar, a frame including two longitudinal frame members connected to the cutter bar at localities outwardly of the swath of the sickle, wheels disposed inwardly of the frame members and stub shafts carried by the frame members and extending inwardly therefrom for supporting said wheels.

5. In a mower, a cutting mechanism including a cutter bar and a sickle movable along said cutter bar, a frame including two longitudinal frame members connected to the cutter bar and extending upwardly therefrom and a cross frame member connected to the longitudinal frame members at their upper ends, wheels disposed inwardly of the frame members and entirely below said cross frame member, a motor carried by said cross member and disposed above the same, and transmission means for driving said wheels and sickle, said means being disposed substantially above the cross frame member and outwardly beyond said wheels.

6. A frame for supporting the cutter bar of a mower, said frame including a transverse frame member disposed rearwardly of the cutter bar and at an elevation above the same, frame members extending from said transverse frame member to said cutter bar, depending frame members extending downwardly below said transverse frame member rigidly supported with reference thereto, supporting wheels disposed in proximity to said depending frame members, and stub axles carried by said depending frame members and extending inwardly therefrom for rotatably supporting said wheels.

7. A frame for supporting the cutter bar of a mower, said frame including a transverse frame member disposed rearwardly of the cutter bar and at an elevation above the same, frame members extending from said transverse frame member to said cutter bar, depending frame members extending downwardly below said transverse frame member rigidly supported with reference thereto, said depending frame members and said second named frame members being disposed substantially in spaced parallel vertical planes, the distance between said planes being substantially equal to the swath of the cutting mechanism of the mower, supporting wheels disposed in proximity to said depending frame members, stub axles carried by said depending frame members and extending inwardly therefrom for rotatably supporting said wheels.

8. A frame for supporting the cutter bar of a mower, said frame including a transverse frame member disposed rearwardly of the cutter bar and at an elevation above the same, frame members extending from said transverse frame member to said cutter bar, depending frame members extending downwardly below said transverse frame member rigidly supported with reference thereto, said depending frame members and said second named frame members being disposed substantially in spaced parallel vertical planes, supporting wheels disposed in proximity to said depending frame members, stub axles carried by said depending frame members and extending inwardly therefrom for rotatably supporting said wheels.

ROBERT S. KINKEAD.